(12) United States Patent
Yeh

(10) Patent No.: US 6,737,573 B2
(45) Date of Patent: May 18, 2004

(54) BACKUP POWER SUPPLY APPARATUS

(75) Inventor: Edward Yeh, Keelung (TW)

(73) Assignee: Chenming Mold Ind. Corp., Keelung (TW)

( * ) Notice: Subject to any disclaimer, the term of this patent is extended or adjusted under 35 U.S.C. 154(b) by 90 days.

(21) Appl. No.: 10/035,130

(22) Filed: Jan. 4, 2002

(65) Prior Publication Data

US 2003/0127125 A1 Jul. 10, 2003

(51) Int. Cl.[7] .................. H01L 31/045; H01L 31/048
(52) U.S. Cl. ............... 136/245; 136/251; 136/291; 136/292; 136/244; 310/300; 320/101
(58) Field of Search ................. 136/245, 251, 136/291, 292, 244; 310/300; 320/101

(56) References Cited

U.S. PATENT DOCUMENTS 5,522,943 A * 6/1996 Spencer et al. ............ 136/245
6,320,114 B1 * 11/2001 Kuechler .................. 136/245
6,476,311 B1 * 11/2002 Lee et al. .................. 136/244

FOREIGN PATENT DOCUMENTS

| DE | 29806604 U1 | * | 7/1998 |
| JP | 5-308147 A | * | 11/1993 |
| WO | WO 00/14849 A1 | * | 3/2000 |

* cited by examiner

Primary Examiner—Alan Diamond
(74) Attorney, Agent, or Firm—Birch, Stewart, Kolasch & Birch, LLP

(57) ABSTRACT

A backup power supply apparatus. The apparatus includes a light absorbing device which consists of at least one light absorbing element. The light absorbing elements are pivotally engaged with each other and are foldable for being housed inside a casing for portability. The light absorbing elements may be unfolded to absorb light from a light source to generate electric power output required by a load.

11 Claims, 6 Drawing Sheets

BACKUP POWER SUPPLY APPARATUS

FIELD OF THE INVENTION

The present invention relates to a backup power supply apparatus and particularly an apparatus for absorbing light from a light source and generating electric power output required by a load.

BACKGROUND OF THE INVENTION

Electric devices (or loads) such as notebook computers, handheld computers, camcorders, digital cameras, Global Positioning Systems, walkmans, Compact Disc (CD) players, Mini-Disc players (MDs) when used indoors, in order to save electric power of batteries or charged batteries, users usually utilize transformers or voltage converters connected to the electric devices to plug in conventional outlet power of 110V/220V AC, to convert to DC power to supply electric power to the electric devices. When the electric devices are used outdoors and no conventional outlet power is available, then the charged batteries contained in the electric devices will provide the needed electric power.

However, portable electric devices have a common problem, i.e. when used outdoors, the charged batteries quickly run out of electric power, since no power from a conventional outlet is available to plug the transformers or voltage converters, or replacement batteries are not available. As a result, the electric devices could become useless and cause a lot of inconveniences.

SUMMARY OF THE INVENTION

The primary object of the invention is to resolve the foregoing disadvantages. The invention utilizes a light source absorbing device to absorb a light source for immediately generating electric power to supply the load.

Another object of the invention is to provide a foldable, small in size and light in weight backup power supply apparatus for outdoor use.

A further object of the invention is to provide an apparatus that does not harm the environment or cause recycling problems.

Yet another object of the invention is to provide an apparatus that can supply electric power to a load in the event of disasters to allow users to emit rescue signals through the load for seeking help.

In order to achieve aforesaid objects, the backup power supply apparatus of the invention includes a light absorbing device and a casing for housing the light absorbing device. The light absorbing device can absorb light and generate electric power output which may run through a charge circuit, a charge battery and a voltage conversion circuit to generate required electric power to supply the load.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
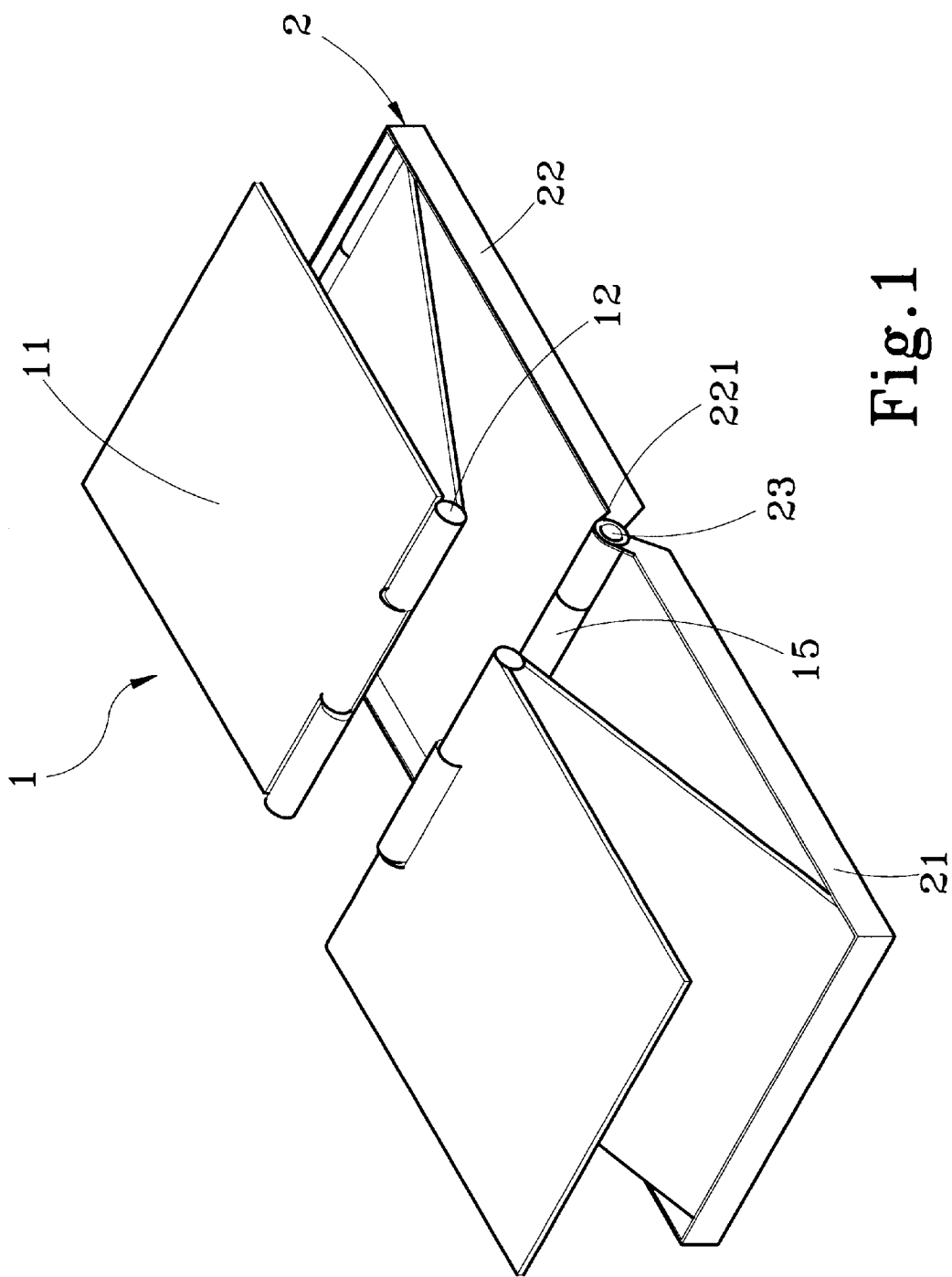
FIG. 1 is a perspective view of the inventive device in a partially unfolded state.
Figure 2:
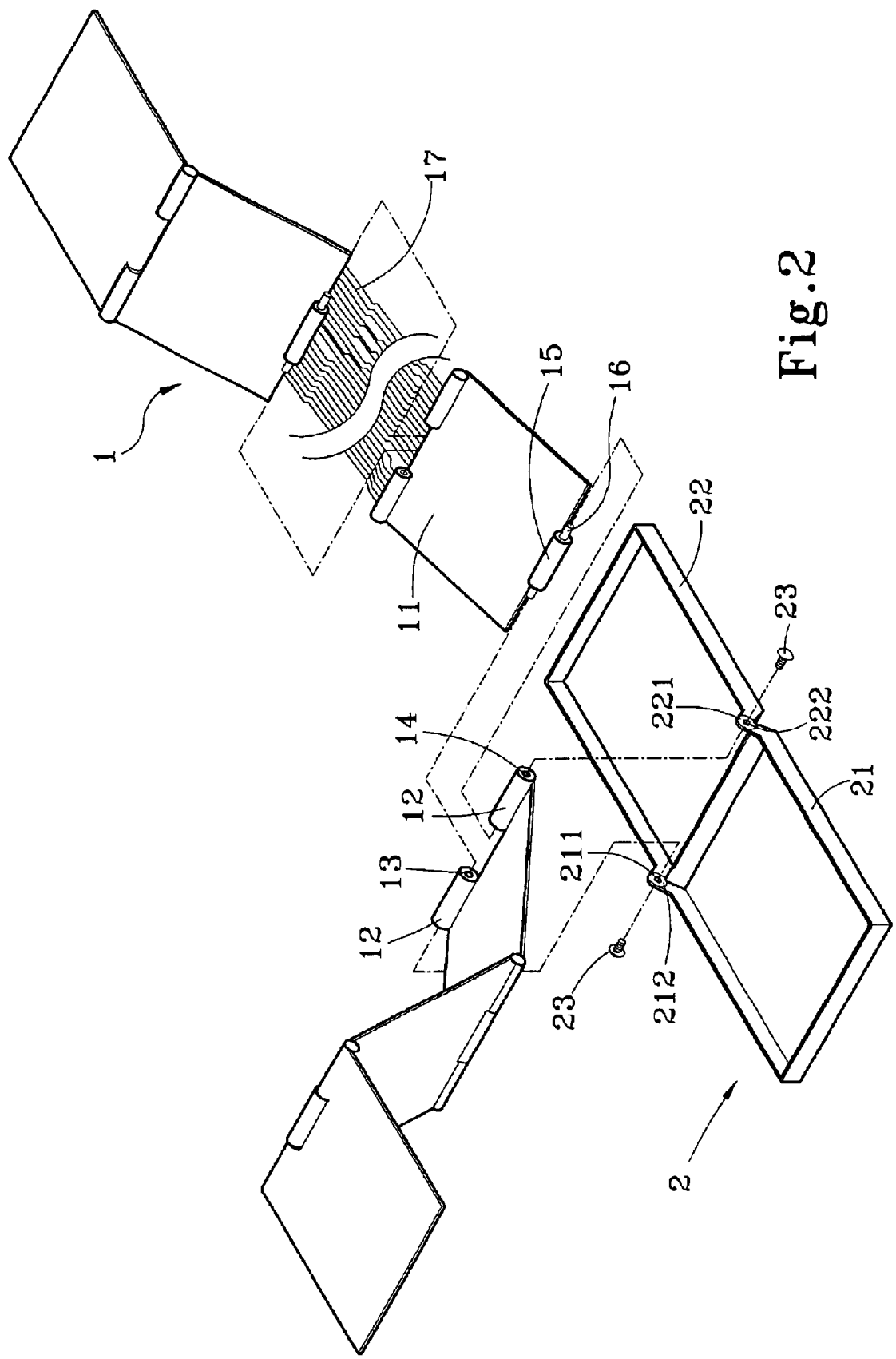
FIG. 2 is an exploded view of the inventive device.

Referring to FIG. 1, the backup power supply apparatus of the invention includes a light absorbing device 1 and a casing 2 for housing the light absorbing device 1. The light absorbing device 1 may receive light from a light source and generate an electric power output which may run through a charge circuit, a charge battery and a voltage conversion circuit to become an electric power supply for a load (such as a notebook computer, a handheld computer, a camcorder, a digital camera, a Global Positioning System, a walkman, a CD players, a MD, a handset) to use.

The light absorbing device 1 includes at least one light absorbing element 11, which may be a solar energy panel. The solar energy panel is conventional and known in the art, thus a detailed explanation of its construction and principle are omitted. Each light absorbing element 11 has at one end formed with two corresponding spaced-apart first pivotal shafts 12. Each first pivotal shaft 12 has an inner end formed with a first pivotal section 13 and an outer end formed with a first pivotal cavity 14. The light absorbing element 11 has another end formed with a second pivotal shaft 15. The second pivotal shaft 15 has two ends formed respectively with a jutting stub 16. The jutting stub 16 may be pivotally engaged with the first pivotal section 13 of the first pivotal shaft 12 of an adjacent light absorbing element. Hence every light absorbing element 11 becomes foldable. Each light absorbing element 11 further has a conductive element 17 to transmit electric power to a neighboring light absorbing element. The conductive element 17 may be, but is not limited to, a pliable flat cable or conductive contacts located on the edge of the light absorbing element 11 (the conductive contacts are located on positions connectable with one another when every light absorbing element 11 is extended or unfolded).

The casing 2 includes a first cap 21 and a second cap 22 which have respectively a first pivotal lug 211 and a second pivotal lug 221. The pivotal lugs 211, 221 have respectively a first pivotal aperture 212 and a second pivotal aperture 222. The first pivotal aperture 212 and the second pivotal aperture 222 may correspond to the first pivotal cavities 14 located on the outer ends of the light absorbing element 11, and the pivotal shafts 12 and the pivotal lugs 211, 221 are fastened together via stub shafts 23 for coupling the light absorbing element 11 to the casing 2. Every light absorbing element 11 may be folded and housed inside the casing 2 to become a compact size to allow users to carry the device and for outdoors use. Thus in the absence of backup battery power or city/outlet power, the apparatus can absorb light to supply the load with required electric power.

Figure 3:
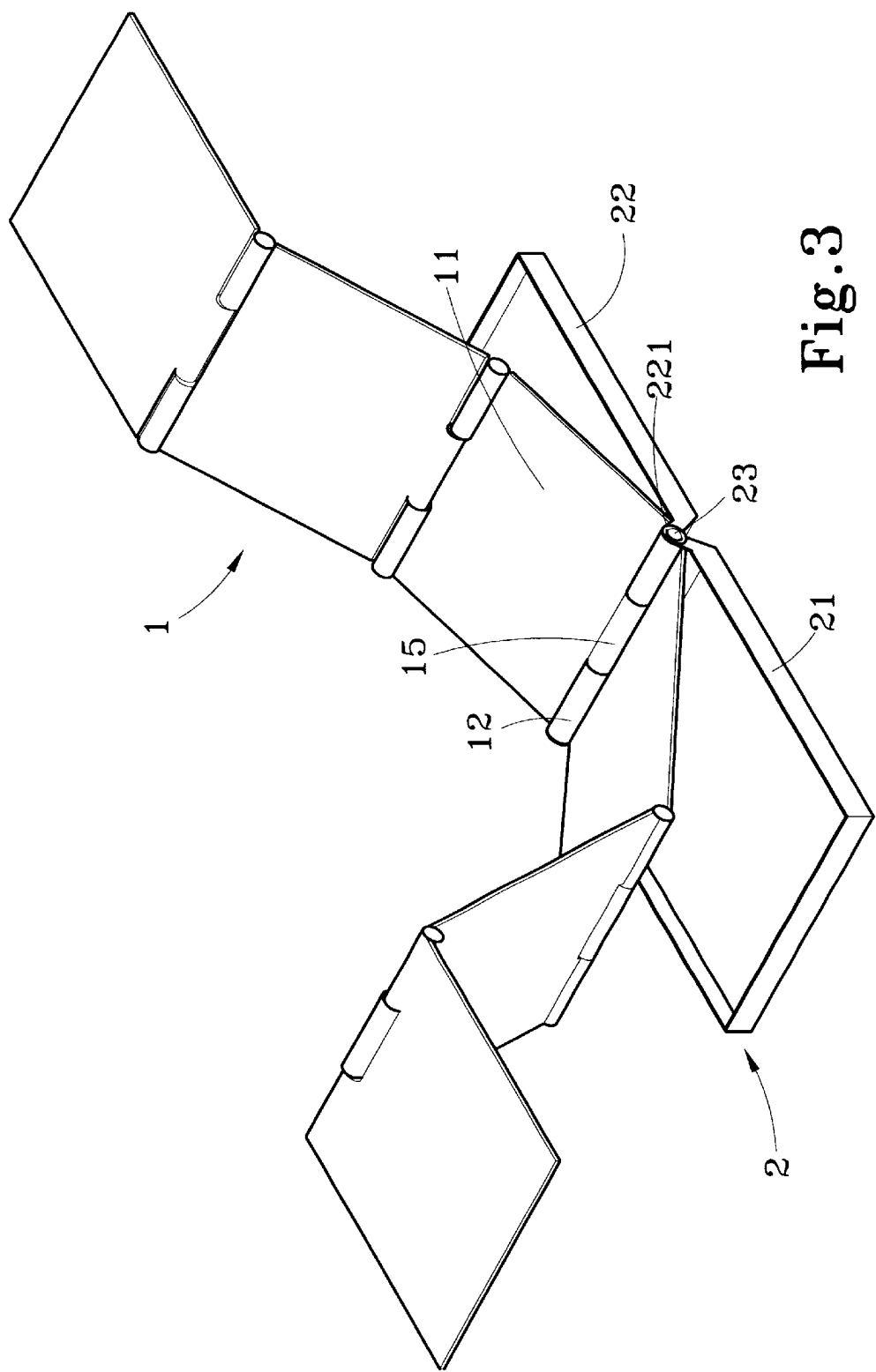
FIG. 3 is a schematic view of the inventive device in an almost fully unfolded state.
Figure 4:
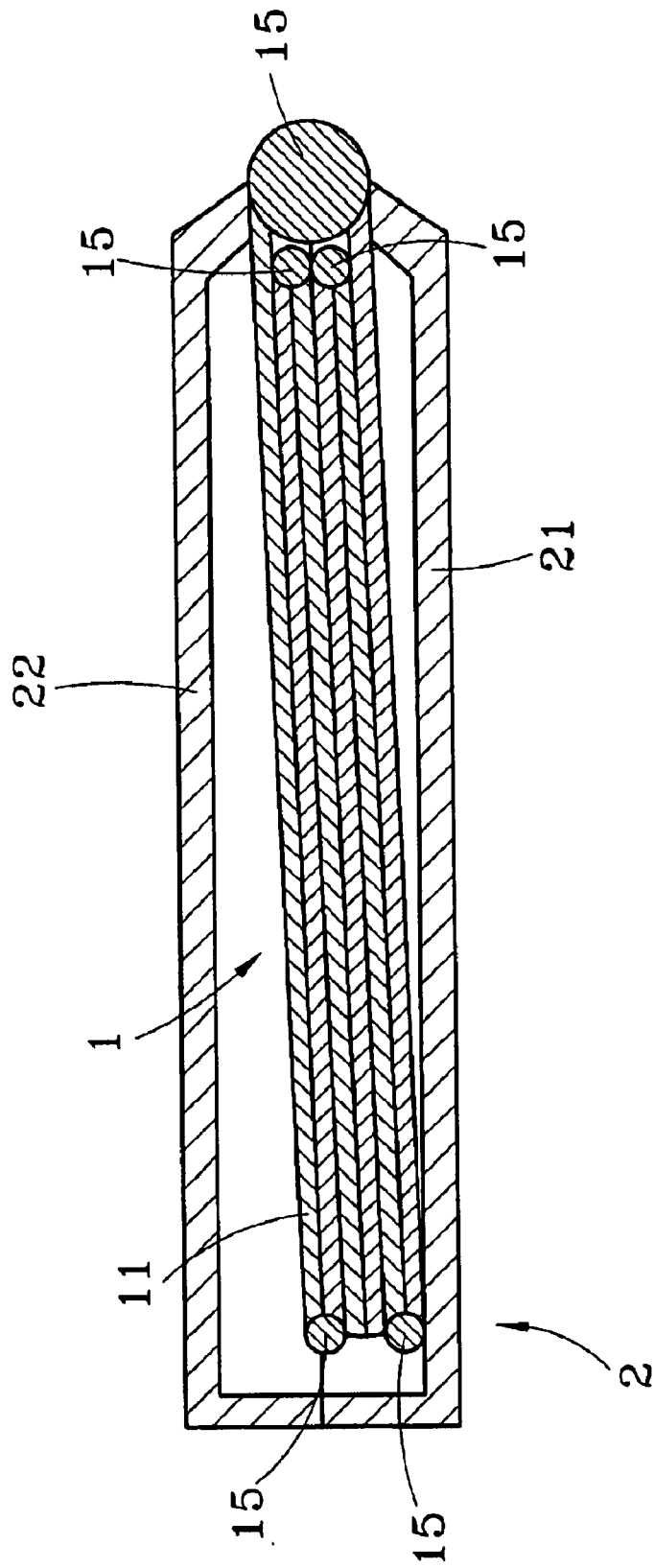
FIG. 4 is a sectional view of the inventive device in a fully folded or compacted state.

FIGS. 3 and 4 show the inventive device in an almost fully unfolded state and a fully folded or compacted state, respectively. When a user carries the backup power supply apparatus outdoors, and the main power supply of the notebook computer, handheld computer, camcorder, digital camera, Global Positioning System, Walkman, CD player, MD, or handset are running out, and no backup batteries are available, or no city/outlet power of 110/220V AC is available for converting to DC power, the user may utilize the backup power supply apparatus. When in use, the casing 2 is unfolded and the light absorbing element 11 of the light absorbing device 1 are individually unfolded or extended to absorb light from a light source. The light absorbing element 11 receives light projected from a light source and provides an electric power output to supply the load for use.

When the backup power supply apparatus is not in use, the light absorbing elements 11 are folded one by one, and placed respectively into the first cap 21 and the second cap 22, and then the caps 21, 22 are folded to house the light absorbing device 1 completely inside the casing 2 to facilitate carrying by the user.

Figure 5:
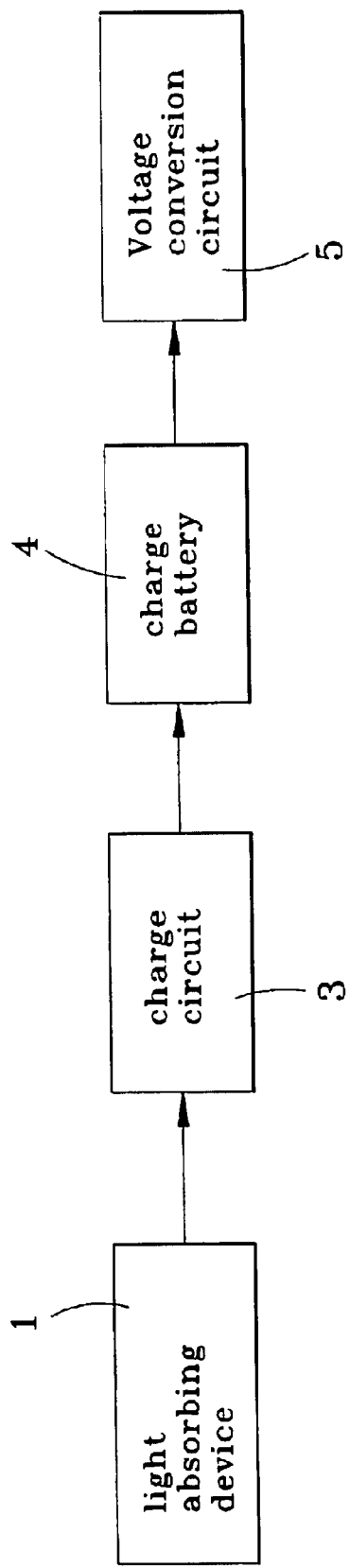
FIG. 5 is a flow chart schematic for power supply conversion.

Referring to FIG. 5, the process of power supply conversion of the invention, the charge circuit 3, charge battery 4 and voltage conversion circuit 5 disclosed in the drawings are conventional techniques that are known in the art, and thus the details are omitted here.

When every light absorbing element 11 of the light absorbing device 1 is unfolded to receive light from a light source, electric power generated by each light absorbing element 11 will be delivered to the charge circuit 3, the charge circuit 3 then charges the charge battery 4, the charge battery 4 will release electricity to the voltage conversion circuit (transformer or power supply converter) 5 to change the voltage for providing required power supply to the load.

Moreover, electric power generated by the light source absorbing device 1 may be directly output to the charge circuit used by the load to allow the charge circuit of the load to directly charge the battery used by the load, or directly provide power supply to the load.

In addition, electric power generated by the light absorbing device 1 may also be directly output to the voltage conversion circuit used by the load to allow the voltage conversion circuit of the load directly to provide required power supply to the load.

Figure 6:
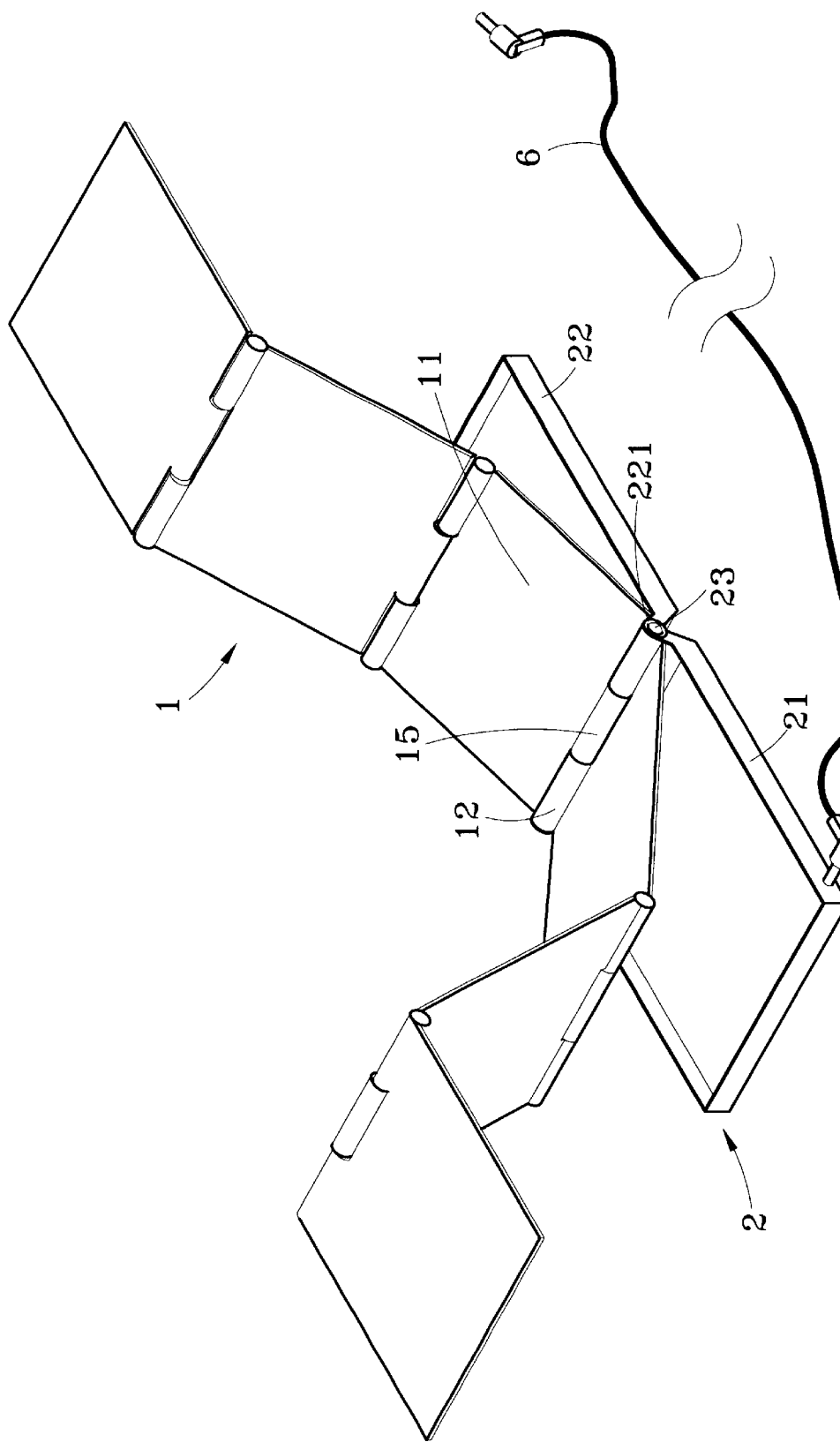
FIG. 6 is a schematic view of another embodiment of the inventive device.

Referring to FIG. 6 for another embodiment of the invention, the charge circuit 3, charge battery 4 (shown in FIG. 5) and voltage conversion circuit 5 are directly installed in the casing 2. Electric power output from the light absorbing device 1 is directly transferred through the charge circuit 3, charge battery 4 and voltage conversion circuit 5 for conversion, then through a power cord 6 plugging in the load. Under such a, condition, electric power output from the backup power supply apparatus may be directly delivered to the load for use via the power cord 6.

Furthermore, the backup power supply apparatus of the invention does not harm the environment or cause recycling problems. In the event of disasters the inventive device can provide power supply needed for a load which may be used to emit rescue signals to seek help.

What is claimed is:

1. A backup power supply apparatus, comprising:
    a light absorbing device comprising at least one light absorbing element, one end of the light absorbing element formed with first pivotal shafts, another end of the light absorbing element formed with a second pivotal shaft, and a conductive element configured to be connected to adjacent ones of the light absorbing element, respective pairs of the first pivotal shafts are able to be rotatably connected to respective ones of the second pivotal shafts of adjacent light absorbing elements;
    a casing having a first cap and a second cap that are pivotally joined together with respective ones of the pivotal shafts of the at least one light absorbing element via a first pivotal lug and a second pivotal lug; and
    wherein the light absorbing element receives light from a light source and generates electric power required by a load, and the at least one light absorbing element is contained inside the casing when not in use.

2. The backup power supply apparatus as claimed in claim 1, wherein the light absorbing element comprises a solar energy panel.

3. The backup power supply apparatus as claimed in claim 1, wherein each of the first pivotal shafts has an inner end formed with a first pivotal section and an outer end formed with a first pivotal cavity.

4. The backup power supply apparatus as claimed in claim 1, wherein the second pivotal shaft has two ends formed respectively with a jutting stub.

5. The backup power supply apparatus as claimed in claim 1, wherein the conductive element comprises a pliable flat cable.

6. The backup power supply apparatus as claimed in claim 1, wherein the conductive element comprises a conductive contact located on a side edge of the light absorbing element.

7. The backup power supply apparatus as claimed in claim 1, wherein the first pivotal lug and the second pivotal lug of the first cap and the second cap have respectively a first pivotal aperture and a second pivotal aperture.

8. The backup power supply apparatus as claimed in claim 1, further comprising a charge circuit, a battery to be charged and a voltage conversion circuit connected to the at least one light absorbing element.

9. The backup power supply apparatus as claimed in claim 8, wherein the voltage conversion circuit is a transformer or a power supply converter.

10. The backup power supply apparatus as claimed in claim 1, wherein electric power generated by the light absorbing device is directly output to a charge circuit used by the load to allow the charge circuit of the load to directly charge a battery to be charged, or is directly provided to the load.

11. The backup power supply apparatus as claimed in claim 1, wherein the electric power generated by the light absorbing device is directly output to a voltage conversion circuit used by the load to allow the voltage conversion circuit of the load to directly provide required power supply to the load.

* * * * *